US011967766B2

(12) United States Patent
Salman

(10) Patent No.: US 11,967,766 B2
(45) Date of Patent: Apr. 23, 2024

(54) ANTENNA ARRAY WITH AMPLITUDE TAPERING AND METHOD THEREFOR

(71) Applicant: BDCM A2 LLC, Dover, DE (US)

(72) Inventor: Safa Salman, Vista, CA (US)

(73) Assignee: BDCM A2 LLC, Dover, DE (US)

( * ) Notice: Subject to any disclaimer, the term of this patent is extended or adjusted under 35 U.S.C. 154(b) by 535 days.

(21) Appl. No.: 17/003,887

(22) Filed: Aug. 26, 2020

(65) Prior Publication Data

US 2021/0066813 A1 Mar. 4, 2021

Related U.S. Application Data

(60) Provisional application No. 62/891,802, filed on Aug. 26, 2019.

(51) Int. Cl.

| | |
|---|---|
| ***H01Q 21/00*** | (2006.01) |
| ***H01Q 3/24*** | (2006.01) |
| ***H01Q 3/26*** | (2006.01) |
| ***H01Q 3/34*** | (2006.01) |
| ***H01Q 5/371*** | (2015.01) |

(52) U.S. Cl.

CPC ........... *H01Q 21/0075* (2013.01); *H01Q 3/24* (2013.01); *H01Q 3/2617* (2013.01); *H01Q 3/34* (2013.01); *H01Q 5/371* (2015.01)

(58) Field of Classification Search

CPC .... H01Q 3/26; H01Q 3/2605; H01Q 21/0006; H01Q 21/22; H01Q 21/061; H04B 7/0617; G01S 7/2813

See application file for complete search history.

(56) References Cited

U.S. PATENT DOCUMENTS

| | | | | |
|---|---|---|---|---|
| 10,700,444 | B2 * | 6/2020 | Chou | H01Q 3/36 |
| 2001/0006374 | A1 * | 7/2001 | Erikmats | H01Q 21/06 343/859 |
| 2016/0352010 | A1 * | 12/2016 | Haskell | H01Q 3/30 |
| 2017/0041038 | A1 | 2/2017 | Kirkpatrick et al. | |
| 2017/0117638 | A1 * | 4/2017 | Kim | H01Q 21/08 |
| 2018/0013192 | A1 * | 1/2018 | Chou | H01Q 3/36 |
| 2019/0131934 | A1 | 5/2019 | Khalil et al. | |
| 2019/0157771 | A1 | 5/2019 | Li et al. | |
| 2020/0028260 | A1 * | 1/2020 | Achour | G01S 13/426 |
| 2020/0328623 | A1 * | 10/2020 | Kimball | H02J 50/402 |

* cited by examiner

*Primary Examiner* — Seokjin Kim

(74) *Attorney, Agent, or Firm* — Dinsmore & Shohl LLP

(57) ABSTRACT

Examples disclosed herein relate to systems and methods for configuring and operating an antenna system. In accordance with various embodiments, the disclosed system and methods utilize amplitude tapering of an antenna array to reduce side lobe levels while optimizing main lobe gain. An antenna array is configured to increase a gain differential by reducing side lobe amplitude. The array of radiating elements is arranged to have a majority of elements at the center of the array with fewer elements on the edges.

9 Claims, 10 Drawing Sheets

ANTENNA ARRAY WITH AMPLITUDE TAPERING AND METHOD THEREFOR

CROSS-REFERENCE TO RELATED APPLICATIONS

This application claims priority from U.S. Provisional Application No. 62/891,802, filed on Aug. 26, 2019, and incorporated by reference in its entirety.

FIELD OF THE INVENTION

The present invention relates to antenna arrays, and methods for beamforming and accuracy in an array.

BACKGROUND

Antenna arrays are seeing an explosion of applications due to the spread of the Internet of Things (IoT), device-to-device communications, referred to as X2X, and automation, such as for self-driving cars which rely on radar performance. Conventional antennas use an array of radiating elements having a main lobe in the form of a radiation beam that has maximum gain. In addition, side lobes result from the generated beam, wherein the side lobes have less energy and gain than the main lobe, but which in some cases interfere with proper operation of the antenna array. It is desirable to lower the side lobe levels of the overall array while maintaining the peak gain in the main lobe. Therefore, there is a need for an antenna system and methods of configuring and operating the antenna system that enables generation of the desired beamform.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1:
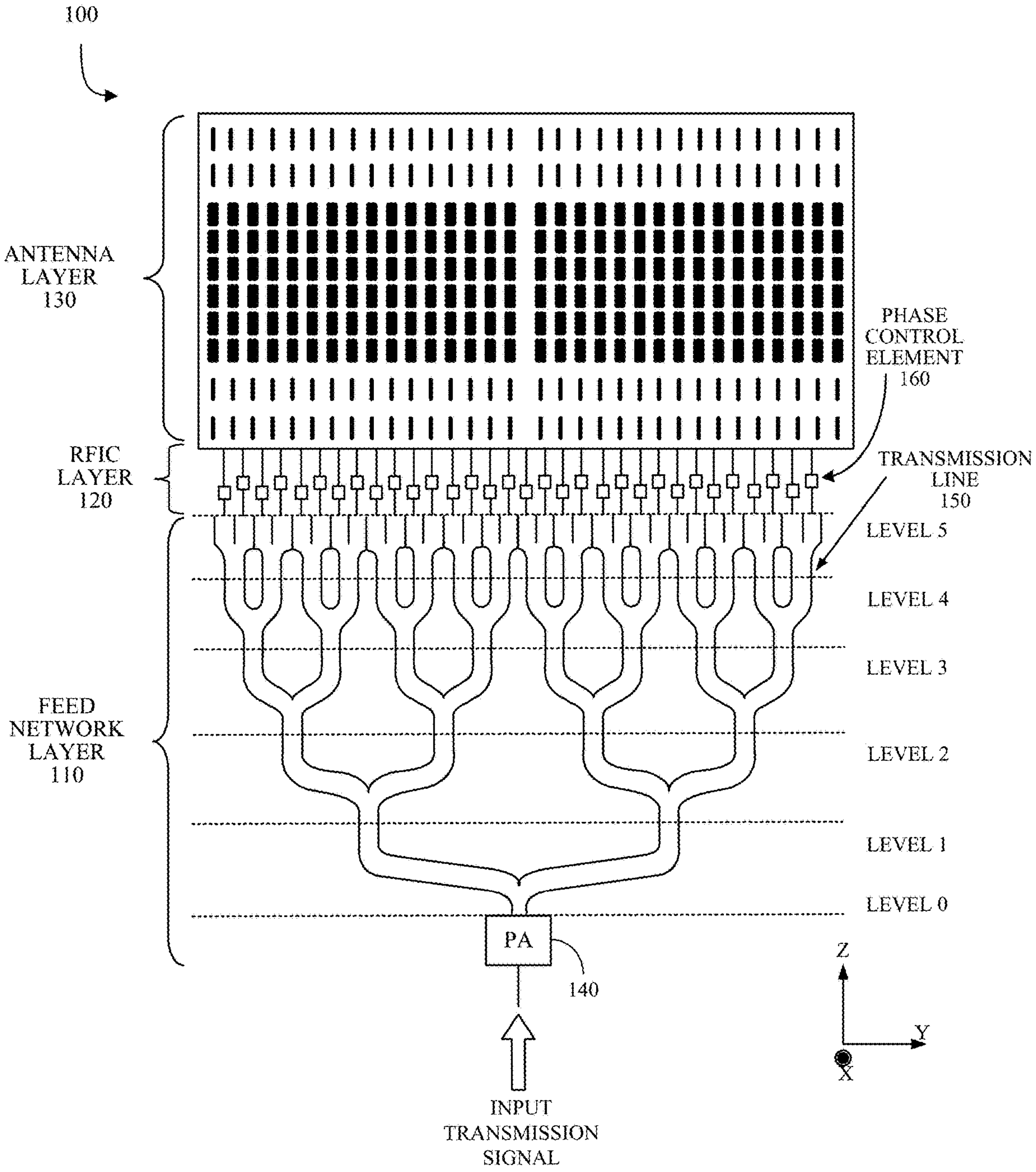
FIG. 1 illustrates an antenna system having a plurality of radiating elements, according to embodiments of the present inventions.

The present disclosure describes designs and methods for amplitude tapering in an antenna array to reduce side lobes while optimizing main lobe performance. In some examples of conventional antenna array designs having a feed network, tapering is introduced at the feed network wherein a weighting factor is applied to transmission paths to reduce the input power at each antenna element relative to the center elements. Some of these weights are provided by the Taylor, Chebyshev, Kaiser, or Gaussian weighting factors that depend on the number of elements and the desired side lobe level. An example is illustrated in FIG. 1 of an antenna array to which tapering may be applied in the feed network. Each single antenna element in the array represents a series fed patch array along the Y direction and that series has one single input per row at X=0.

FIG. 1 illustrates an antenna system 100 in accordance with some implementations of the subject technology. The antenna system 100 includes a feed network layer 110, a Radio Frequency Integrated Circuit (RFIC) layer 120, and an antenna layer 130. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In the illustrated example, the antenna layer 130 is a transmit antenna that has a number of radiating elements creating transmit paths for transmission of radiating signals to an object at different directions. The antenna system 100 may also be adapted for a receive antenna. In various implementations, the radiating elements in the antenna layer 130 are meta-structures or patches in an array configuration such as in a 32-element transmit antenna. The radiating elements may be coupled to the feed network layer 110 and to the phase control elements 160, such as phase shifters.

The feed network layer 110 is a type of a power divider circuit that provides a corporate feed dividing an input transmission signal received from a transmission signal controller, such as a microcontroller (not shown) for propagation to the RFIC layer 120. In the illustrated example, a PA 140 provides signal amplification to the input transmission signal and the power divider circuit divides the amplified transmission signal through a network of paths or transmission lines 150.

Within the antenna system 100 is a network of paths, in which each of the division points is identified according to a division level. As depicted in FIG. 1, the feed network layer 110 includes a first level of transmission lines (depicted as LEVEL 0), a second level of transmission lines (depicted as LEVEL 1), a third level of transmission lines (depicted as LEVEL 2), a fourth level of transmission lines (depicted as LEVEL 3), a fifth level of transmission lines (depicted as LEVEL 4), and a sixth level of transmission lines (depicted as LEVEL 5). Each level in the feed network layer 110 doubles its paths: LEVEL 1 has 2 paths, LEVEL 2 has 4 paths, LEVEL 3 has 8 paths, LEVEL 4 has 16 paths, and LEVEL 5 has 32 paths. In this implementation, the paths have similar dimensions; however, the size of the paths may be configured differently to achieve a desired transmission and/or radiation result. The transmission lines 150 of the feed network layer 110 may reside in a substrate of the antenna system 100.

In some implementations, the feed network layer 110 is impedance-matched, such that the impedances at each end of a transmission line matches the characteristic impedance of the line. Each transmission line may be bounded by a set of vias. In some implementations, matching vias are also provided for better impedance matching and phase control.

The RFIC layer 120 may provide a reactance control with a varactor, a set of varactors, a phase shift network, or other mechanisms without departing from the scope of the present disclosure. In FIG. 1, the RFIC layer 120 includes phase control elements 160 for providing phase shifts to the transmission signal propagating from the feed network layer 110 to align the signals in time.

Although the antenna structure 100 is described as a transmit antenna, the antenna structure 100 may include, or operate as, a receive antenna, where the feed network layer 110 may include, or operate as, a combination network that combines received signals from the antenna layer 130 to a transceiver (not shown) for processing. In this respect, the RFIC layer 120 may include low-noise amplifiers (LNAs) for applying low-noise filtering to the received signals. For example, the antenna layer 130 may include a receive antenna that has a number of radiating elements creating receive paths for signals or reflections from an object at a slightly different time. In various implementations, the radiating elements in the antenna layer 130 are meta-structures or patches in an array configuration, such as in a 48-element receive antenna. In some implementations, the radiating elements in the antenna layer 130 are meta-structures or patches in an array configuration having 8-element, 24-element, or 96-element antenna. The radiating elements may be coupled to a combination structure in the feed network layer 110 and to the phase control elements 160, such as phase shifters, and LNAs. The antenna layer 130 may include more than one receive antennas, such as a 24-element antenna, to form a 48-element phased array. Other configurations having a different number of elements may be implemented as well. The receive antennas may have a series of antenna elements and are connected to a series of LNAs and phase shifters, respectively. The combination network may combine the signals from the receive antennas through the phase shifters.

Figure 2:
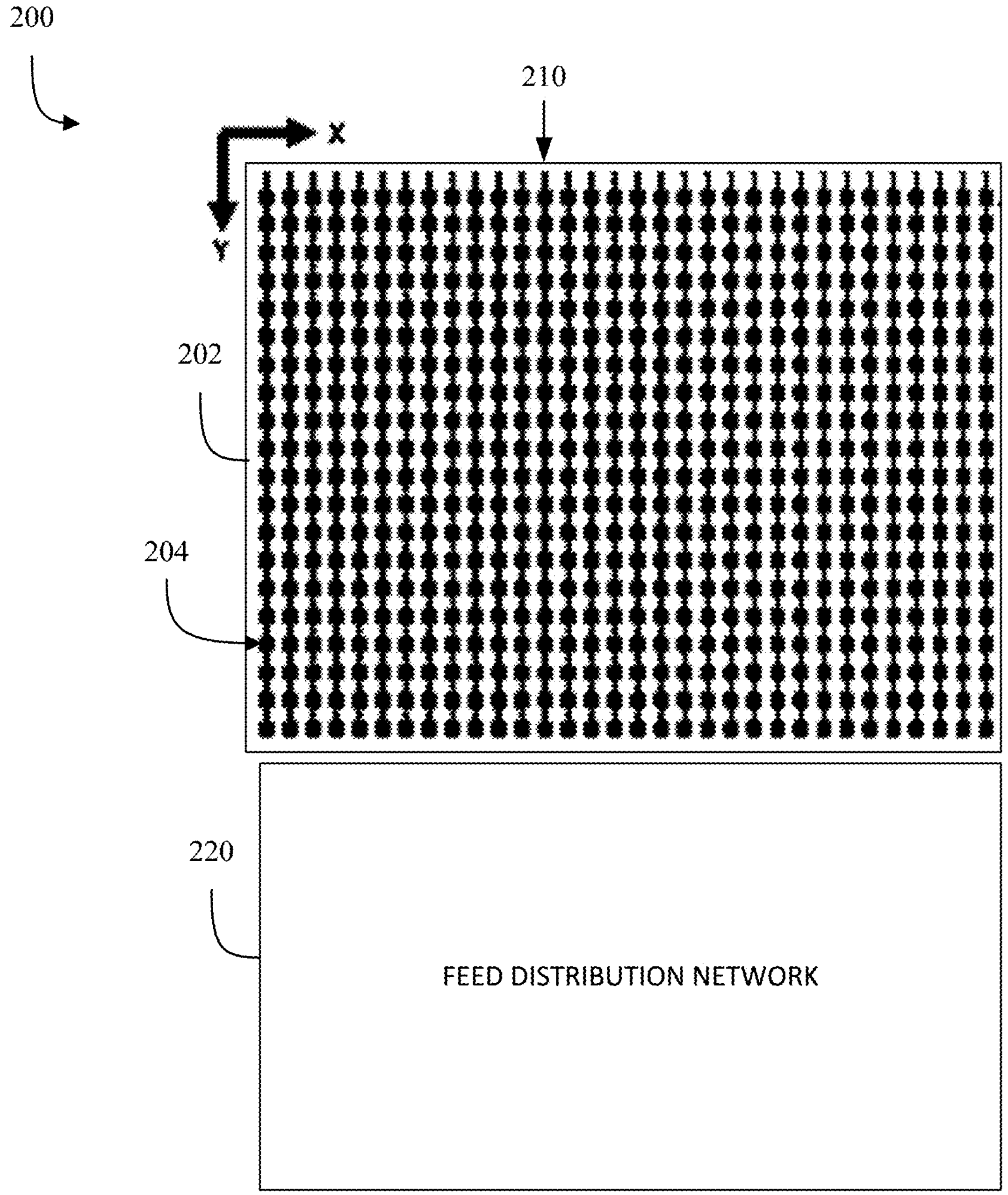
FIG. 2 illustrates an antenna array and feed network, according to embodiments of the present invention.

FIG. 2 illustrates a schematic diagram of an antenna system 200 having an antenna array 202 and a feed distribution network 220, which serves as a power divider/combiner to distribute power to various antenna elements. The antenna array in the illustrated example includes a plurality of radiating elements, such as element 204, arranged in rows in the x-direction and columns in the y-direction. The radiating elements may be conductive patches, metamaterial unit cells, meta-structure elements or other radiating elements designed and configured according to application and corresponding requirements and constraints. In the illustrated example the radiating elements are arranged serially in the y-direction along paths, such as transmission path 210. The feed distribution network 204 includes transmission paths to each of the transmission paths of the antenna array 202. To control beamforming of the antenna system 200 power is distributed to the array 202. This may be done by applying weights to various paths of the antenna array 202, or by other means such that the power supplied to the radiating elements achieves a desired result.

Figure 3:
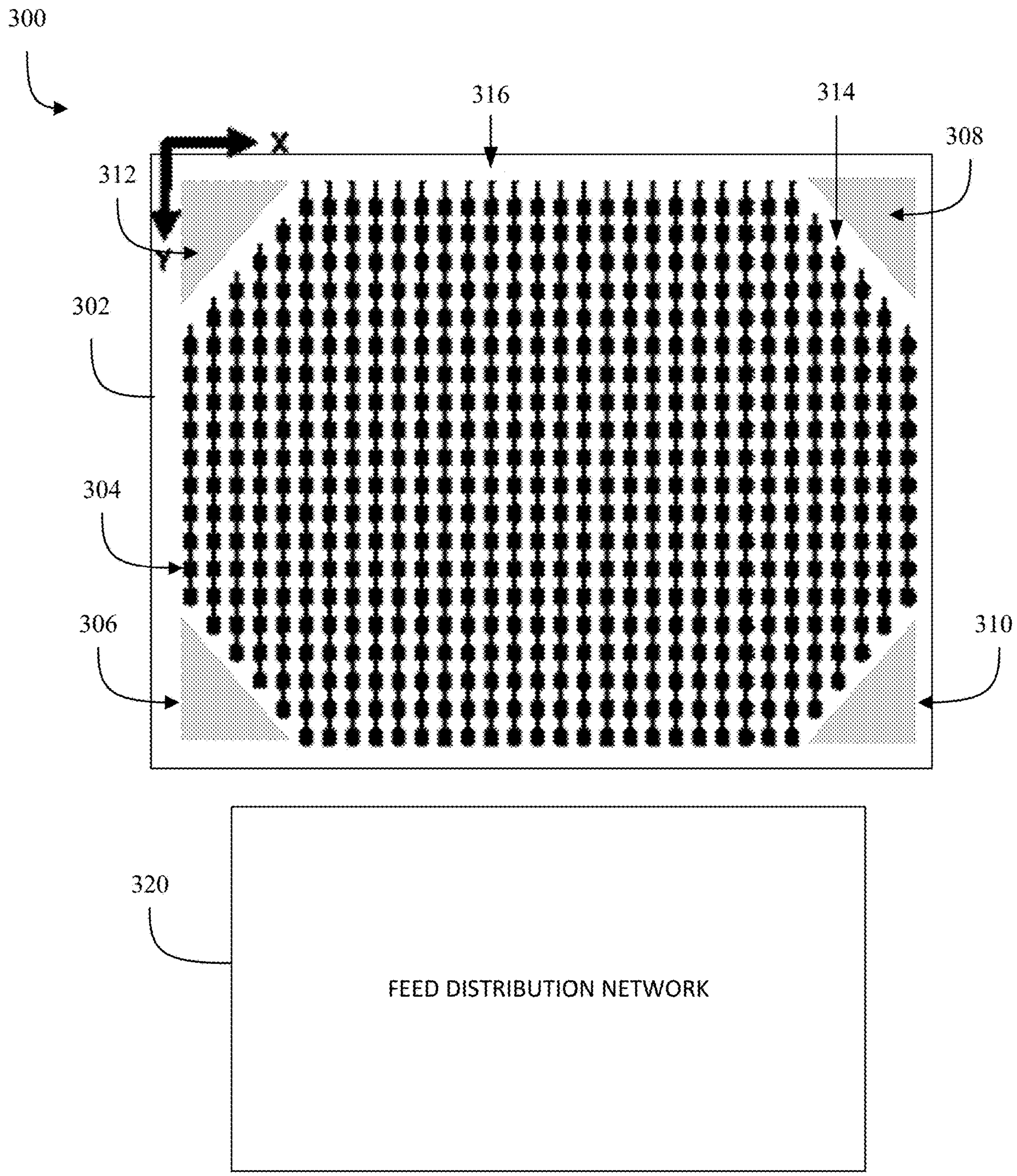
FIG. 3 illustrates an antenna array configuration to achieve amplitude tapering of radiation beams, according to embodiments of the present invention.

FIG. 3 illustrates a schematic diagram of an antenna system 300 having a plurality of radiating elements arranged in a similar manner to that of array 202 of FIG. 2. As depicted in the figure, the antenna system 300 includes an antenna array 302 and a feed distribution network 320, which serves as a power divider/combiner to distribute power to various antenna elements. The feed distribution network 320 feeds energy to the radiating elements, such as element 304. In the configuration of radiating elements of array 302, the center portion in the x-direction has a first number of radiating elements per transmission path, such as path 316. Reduction portions 306, 308, 310, and 312 are positioned at the corners of the array 302 to reduce the amplitude of those portions of the beamform contributing to side lobes. The present embodiment positions long transmission lines, such as transmission line 316, in the center columns and reduces the number of radiating elements at the side columns. The reduction in the number of radiating elements 304 in both x and y-directions forms triangular gaps at the corners of the antenna array 302, i.e., at the reduction portions 306, 308, 310, and 312. The radiating elements 304 may be any of a variety of shapes, such as patches, metamaterial unit cells, meta-structure cells, and so forth. In the present embodiment, the elements are arranged along a transmission line column. Some embodiments may include different shaped gap regions (e.g., reduction portions 306, 308, 310, and 312), such as a square, a hexagon or another shape to achieve a desired result. In some embodiments, less or more gap regions may be configured within an antenna array. The feed distribution network 320 includes a plurality of transmission paths for propagation of signals to the radiating elements, including to the columns having gap regions, such as transmission line 314. The gap regions, i.e., reduction portions, reduce the power radiated in specific areas and thus act to tamper the amplitude of resultant side lobes.

Figure 4:
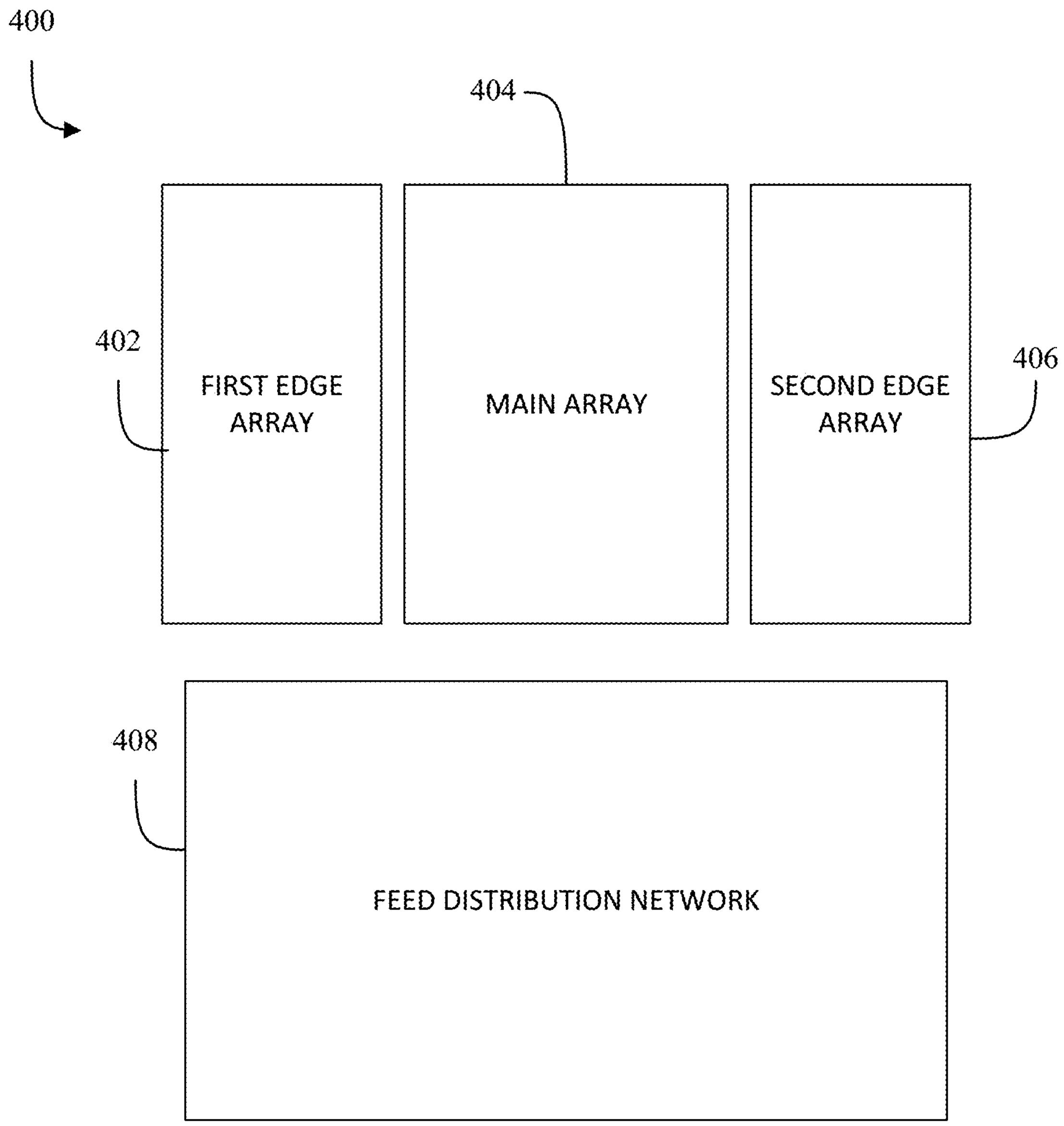
FIG. 4 illustrates an antenna system, according to embodiments of the present invention.

FIG. 4 illustrates an antenna configuration 400 having main array 404 disposed between a first edge array 402 and a second edge array 406. A feed distribution network 408 couples to the main array 404 and edge arrays 402, 406, which have configurations including gap regions for adjusting the beamforms. The feed distribution network 408 of the present embodiment includes phase control elements, which are similar to phase control elements 160 of the antenna system 100 of FIG. 1. The phase control elements (not shown) adjust the beamforms, such as to steer the beam and change the direction and field of view.

Reduction of side lobes of the present antenna implementations enables the system to focus a transmit signal to a specific location without interfering signals and energy. In a radar system, this amplitude tapering enables the system to distinguish between signal reflections corresponding to the main lobe beam, i.e, from the main array 404, from reflections corresponding to side lobe beams, i.e., from the edge arrays 402, 406. This clarifies where the object detection is made giving accuracy to the object detection process. The configurations introducing gap regions, such as reduction portions 306, 308, 310, 312, and edge arrays 402, 406, enable reduction of side lobe levels, amplitude tapering, without increasing the bandwidth of the main lobe. This optimizes the directivity of the antenna array and enables pencil point radiation beams.

In accordance with various embodiments, an antenna array of elements is provided. The antenna array includes a main portion having a first configuration of radiating elements; and at least one edge portion having a second configuration of radiating elements, wherein the at least one edge portion has at least one reduction gap region. In some embodiments, the main portion comprises a plurality of sections, each section having one or more radiating elements. In some embodiments, the antenna array further includes a feed distribution network, wherein the feed distribution network has a plurality of transmission lines coupled to the main portion or a second set of transmission lines coupled to the at least one edge portion. In some embodiments, the at least one edge portion has fewer radiating elements per transmission path than the main portion. In some embodiments, the antenna array further includes a gain control module to apply control weights to a plurality of transmission lines coupled to the array of elements. In some embodiments, the first configuration and the second configuration are a function of desired beam parameters, or the first configuration and the second configuration differ in arrangements of radiating elements.

Figure 5:
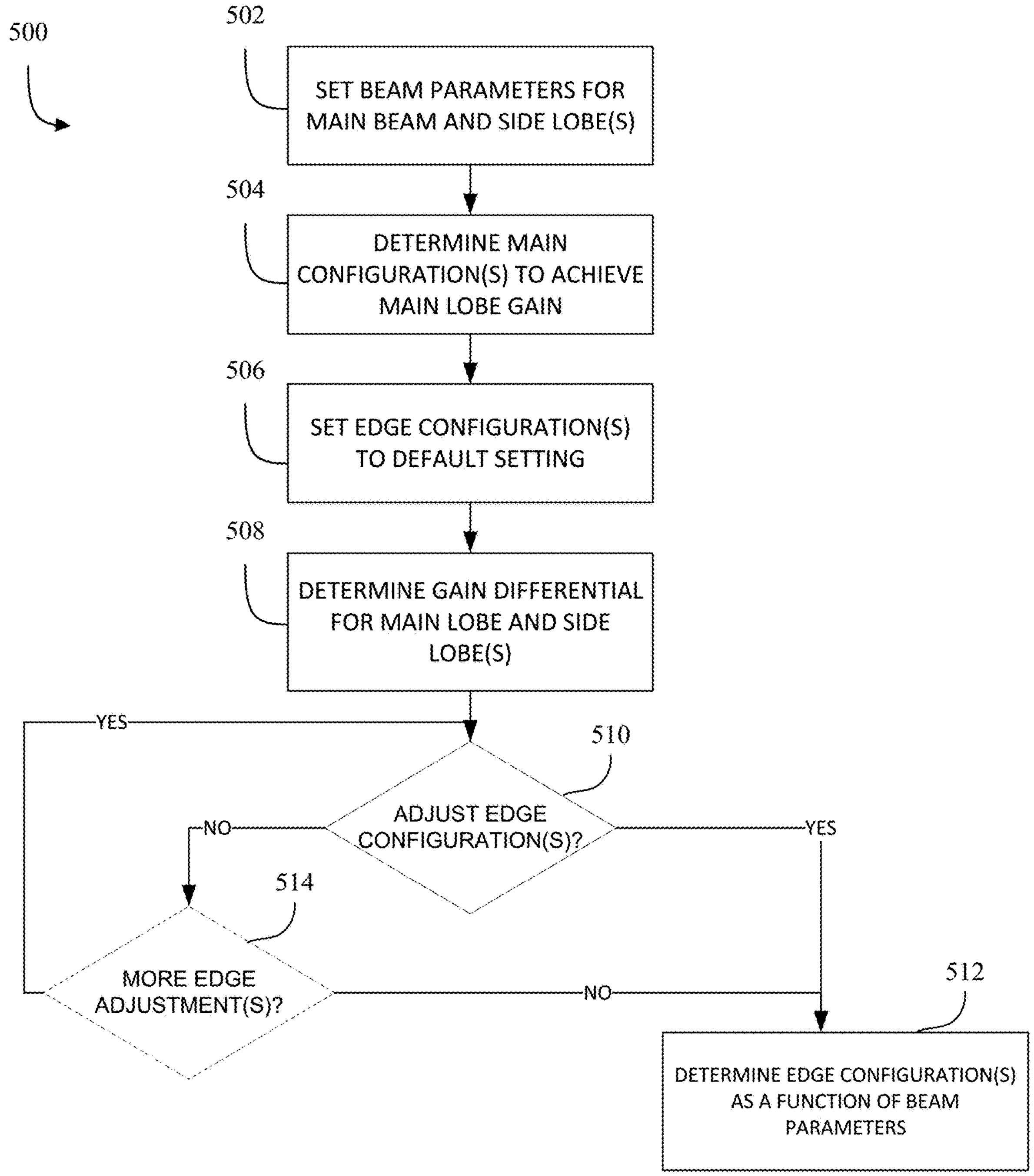
FIG. 5 illustrates a method for configuring an antenna system, according to embodiments of the present invention.

FIG. 5 illustrates a method 500 for operating an antenna array having a main array and one or more amplitude tapering edge arrays. The method 500 includes setting beam parameters for the main beam and side lobe(s), at step 502. In accordance with various embodiments, the amplitude tapering is enabled by setting a ratio of gain of the main lobe to the side lobe(s) to obtain a desired beamform.

The method 500 includes determining main configuration (s) to achieve the main lobe gain, at step 504. In determining the main configuration(s), a full antenna array, such as the system 200 illustrated in FIG. 2, the system 300 illustrated in FIG. 3, or the system 400 illustrated in FIG. 4, can be used to obtain the desired main lobe gain. The method 500 further includes setting edge configurations to a default setting, at step 506. In some implementations, the system 300 illustrated in FIG. 3, or the system 400 illustrated in FIG. 4 is used as the edge configuration.

Figure 10:
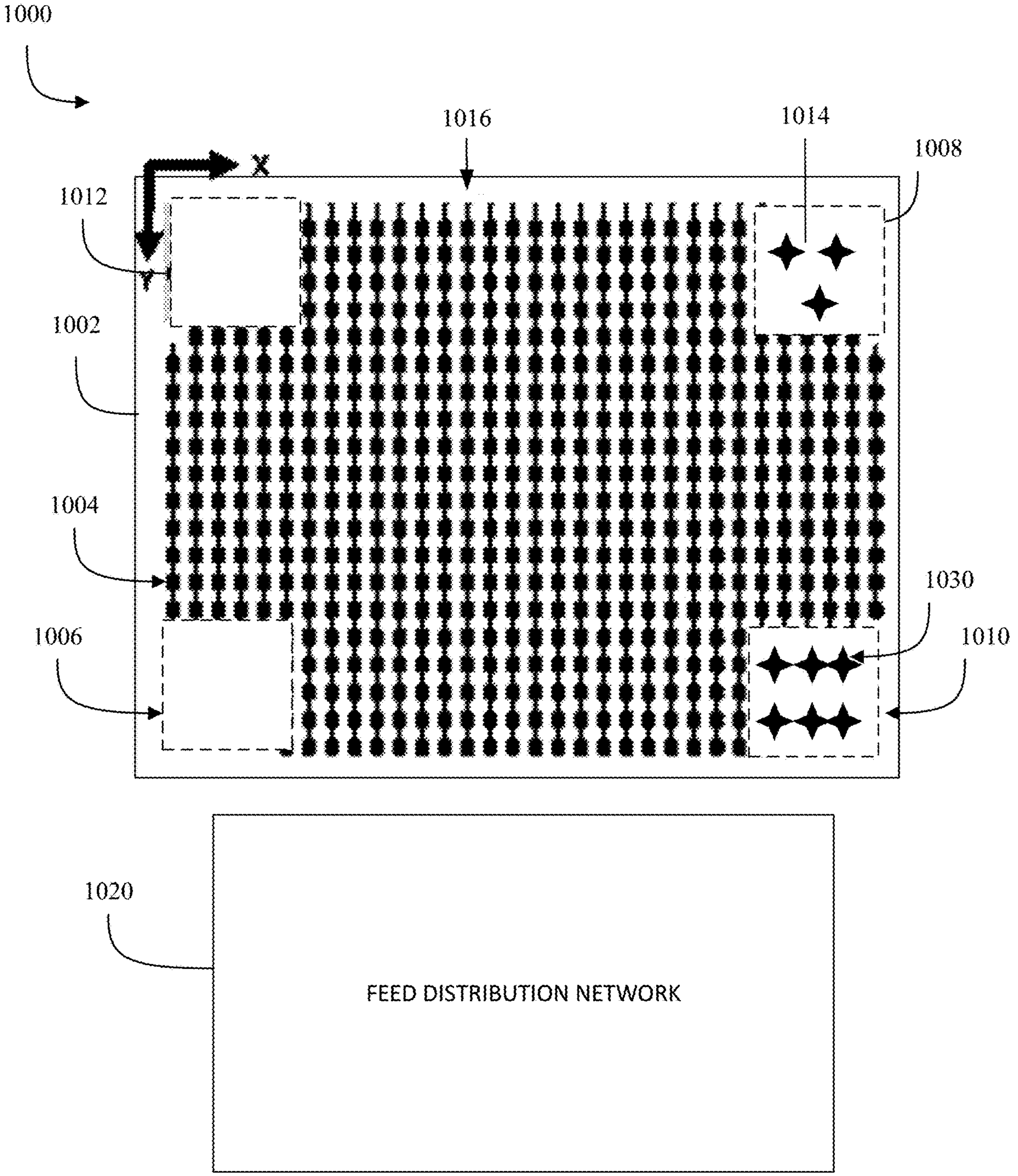
FIG. 10 illustrates an antenna system, according to embodiments of the present invention.

The method 500 further includes determining a gain differential for the main lobe to side lobe(s), at step 508. At step 510, the method 500 includes determining whether to adjust configuration(s) of the edge array(s). If the configuration of the antenna array elements satisfies the desired beamform criteria, the method 500 includes determining an edge configuration as a function of beam parameters, at step 512. If the configuration of the antenna array elements does not satisfy the desired beamform criteria, the method 500 proceeds to determining if there are other edge portions to adjust, at step 514. The edge configuration includes determining placement of edge radiating elements, which may include gap regions. In some embodiments, the edge radiating elements are arranged in a non-linear format, a lattice format or other format. An example is illustrated in FIG. 10 of an alternate edge region configuration.

Some embodiments may have a single edge portion, others have multiple portions. The position of the edge portions is determined by the antenna application, build constraints, size constraints and so forth. Edge portions may be configured individually, or may be determined in an asymmetric manner or symmetric arrangement. When configured individually, the process will determine when edge adjustments are to be made, for example, at step 514.

In accordance with various embodiments, a method for operating an antenna array is disclosed. The method includes setting a set of beam parameters for a main array and at least one edge array portion, wherein the main array is configured to generate a beam having a main lobe and side lobes, and the at least one edge array portion is configured to taper the side lobes. The method includes determining a gain differential of the main lobe and side lobes, adjusting the edge array configuration as a function of beam parameters, and generating a desired beamform. In some embodiments, the main array includes a first plurality of radiating elements configured in the main array configuration and the at least one edge array portion includes a second plurality of radiating elements configured in the edge array configuration. In some embodiments, the main array configuration and the at least one edge array configuration have different arrangements of the respective radiating elements. In some embodiments, adjusting of the edge array configuration includes determining placement of the second plurality of radiating elements in the at least one edge array portion.

Figure 6:
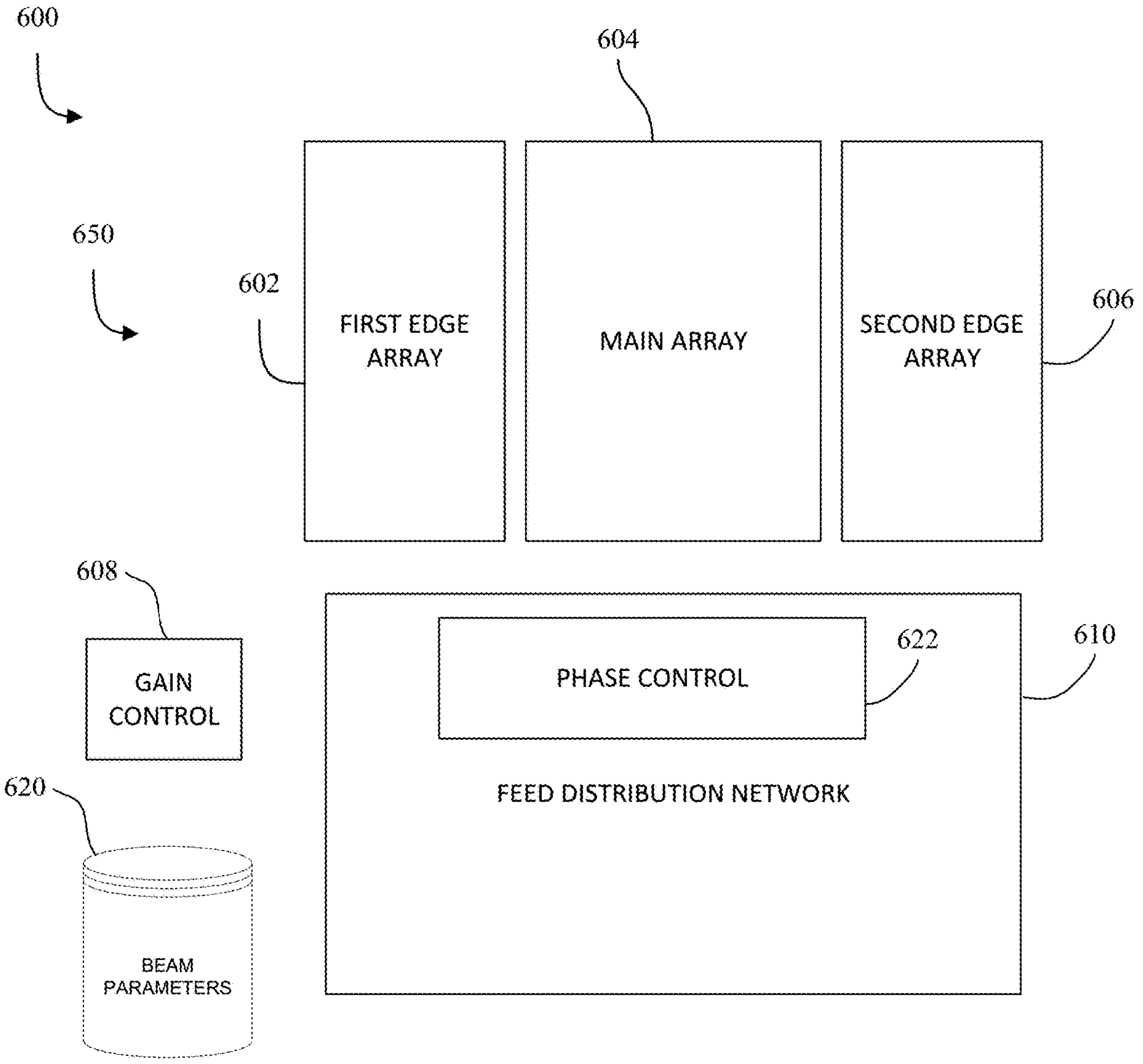
FIG. 6 illustrates an antenna system having multiple antenna array portions and a gain control module, according to embodiments of the present invention.

FIG. 6 illustrates an antenna system 600, according to various embodiments. As shown in FIG. 6, the system 600 includes main array 604 and edge arrays 602, 606, with a feed distribution network 610. In some embodiments, the main array 604, the edge arrays 602, 606, and the feed distribution network 610 are similar or substantially similar to the main arrays 304, 404, edge arrays 306, 308, 310, 312, 402, 406, and the feed distribution network 320, 408 of systems 300 and 400 described with respect to FIGS. 3 and 4. The beam form is controlled by the configuration of the antenna array of system 600, phase control module 622 and gain control 608. In operation, phase control module 622 introduces phase differential to multiple transmission lines feeding the main and/or edge arrays, 602, 604, 606. The gain control 608 applies weights to the transmission lines of the feed distribution network 610 and/or the antenna array 650 to taper the amplitude of beamforms (i.e., amplitude tapering). A weight is applied to one or more of the transmission lines to reduce or increase the amount of power propagating through the transmission line(s). By reducing the power to edge arrays 602, 606, and edge radiating elements, the differential increases between the amplitude of the main lobe to the side lobes. To determine, control and/or adjust the weights of transmission line(s), information is stored in the beam parameters database 620, which provides a mapping of sets of beam parameters to weight sets.

Figure 7:
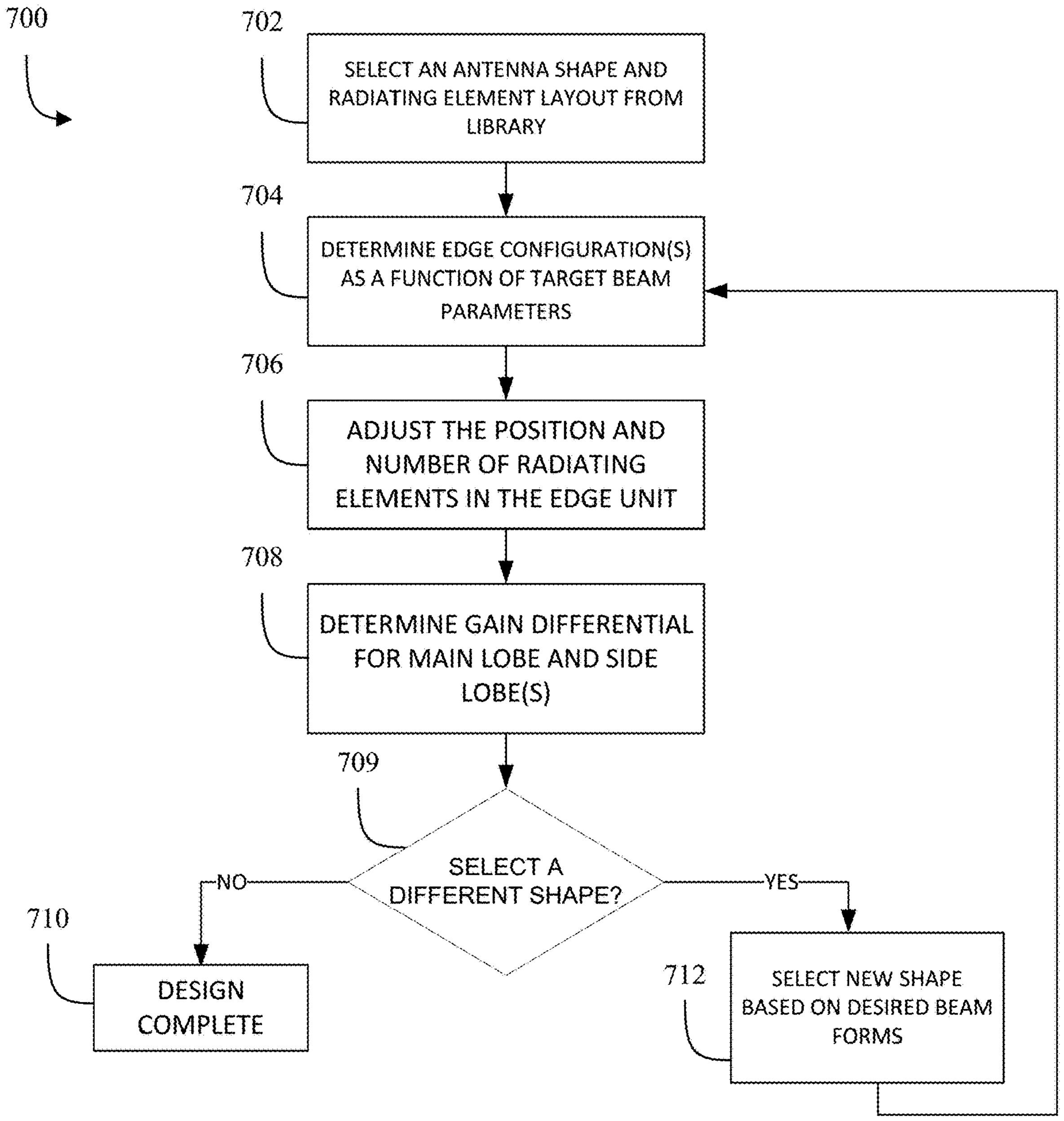
FIG. 7 illustrates a process for configuring an antenna system, according to embodiments of the present invention.

FIG. 7 illustrates a process 700 for configuring and/or operation of an antenna system, such as the antenna system 600 of FIG. 6. The process 700 includes selecting an antenna shape and radiating element layout from a library of options, at step 702. In accordance with various embodiments, the library of options of antenna shapes and layouts of the antenna system include various arrangements and configurations of the antenna components, such as for example, main array 604, the edge arrays 602, 606 within the system 600, or main arrays 304, 404, edge arrays 306, 308, 310, 312, 402, 406 of systems 300 and 400.

The process 700 includes, at step 704, determining the edge configurations as a function of target beam parameters. At step 706, the process 700 includes adjusting the position and number of radiating elements in the edge unit(s) or array portion(s), such as for example, 306, 308, 310, 312, 402, 406, 602, 606. The process 700 then includes determining a gain differential of the main lobe to side lobe(s), at step 708. The process 700 optionally includes selecting a different shape or edge configuration for the antenna array elements, at step 709. If no change is made to the shape, then the process 700 for configuring the antenna array is complete at step 710. If the process 700 includes selecting a new shape based on a desired beamform, the process 700 includes step 712, and the process 700 returns to determining the edge configuration(s) as a function of target beam parameters at step 704.

In accordance with various embodiments, a process for configuring an antenna array is provided. The process includes selecting a first antenna shape and radiating element layout from a library of options, wherein the first antenna shape configured for generating a main lobe and non-tapered side lobes, determining a first edge array configuration as a function of target beam parameters, adjusting position and number of radiating elements in the first edge array configuration, determining a gain differential of the main lobe and the side lobes, generating a desired beamform, and complete configuring of the antenna array. In some embodiments, the first antenna shape includes a main array configuration configured for generating a non-tapered array pattern and the first edge array configuration configured for generating tapered side lobes.

In some embodiments, the method further includes selecting a second antenna shape to determine a second edge array configuration as the function of beam parameters. In some embodiments, the first antenna shape includes position and number of radiating elements in the main array configuration and gap regions in one or more edge portions of the first edge array configuration. In some embodiments, the main array configuration includes a first plurality of radiating elements and the first edge array configuration comprises a second plurality of radiating elements. In some embodiments, the main array configuration and the first edge array configuration have different arrangements of the respective radiating elements.

In some embodiments, the antenna system further includes a feed distribution network, wherein the feed distribution network has a first set of transmission lines coupled to the first plurality of radiating elements and a second set of transmission lines coupled to the second plurality of radiating elements. In some embodiments, the antenna system further includes a gain control module to apply control weights to the first and second plurality of transmission lines respectively coupled to the first and second plurality of radiating elements.

Figure 8:
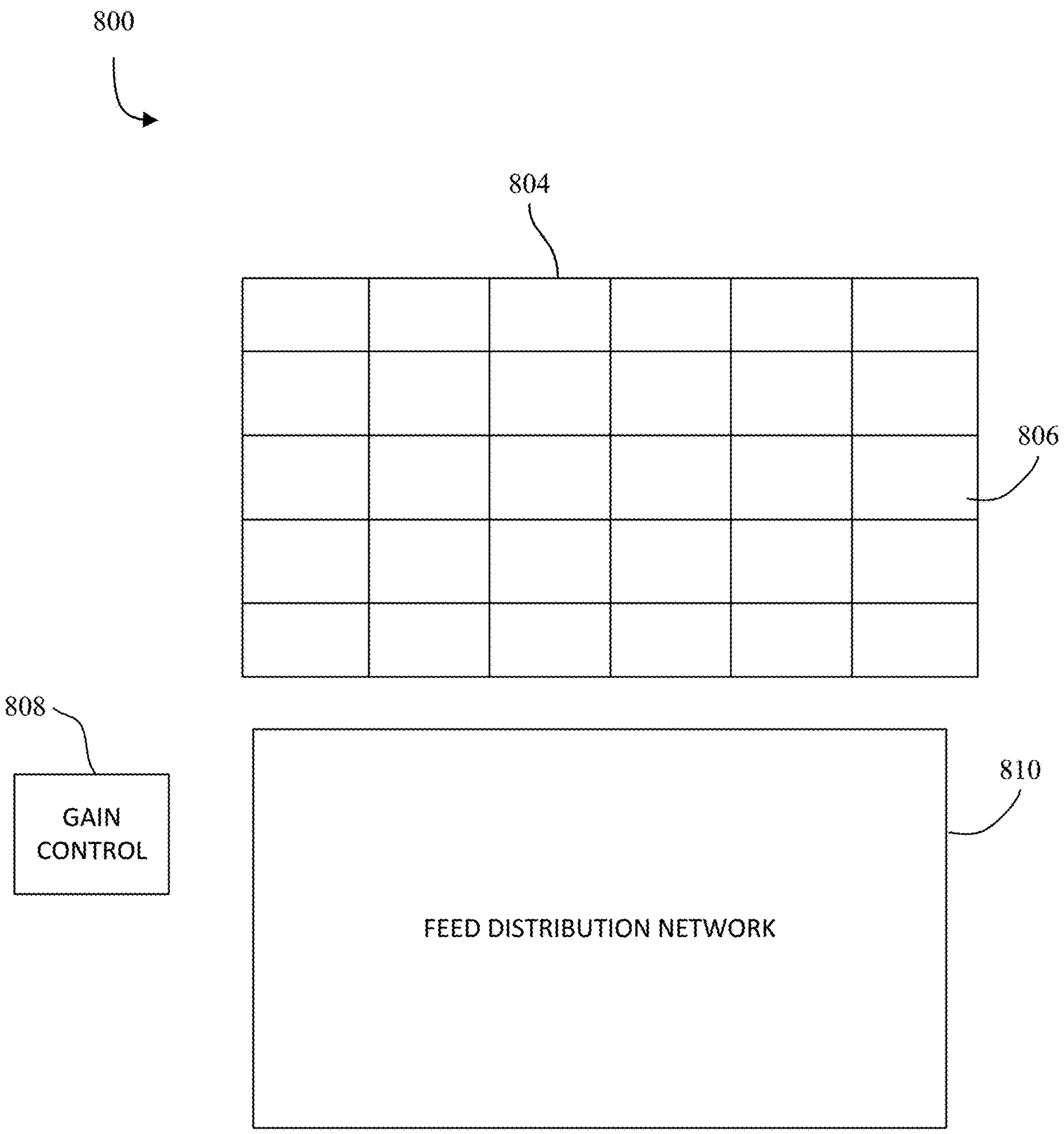
FIG. 8 illustrates an antenna system, according to embodiments of the present invention.

FIG. 8 illustrates an antenna system 800 having an antenna array 804, a feed distribution network 810 and gain control 808, according to various embodiments. As illustrated in the figure, the antenna array 804 is divided into sections 806 enabling a refinement in element configuration within each section 806. In various implementations, each section 806 includes one or more radiating elements, such as elements 204, 304, and gap regions, such as reduction portions or edge arrays 306, 308, 310, 312, 402, 406, 602, 606. In some embodiments, the configuration of the antenna system 800 is configured so that the gap regions, reduced element density of radiation elements, and so forth may be used to achieve a desired beamform. The configuration may be designed to interact with gain control 808, so that weights are applied to signals propagating through a section or a portion of a section as described above with respect to FIGS. 1-7.

Figure 9:
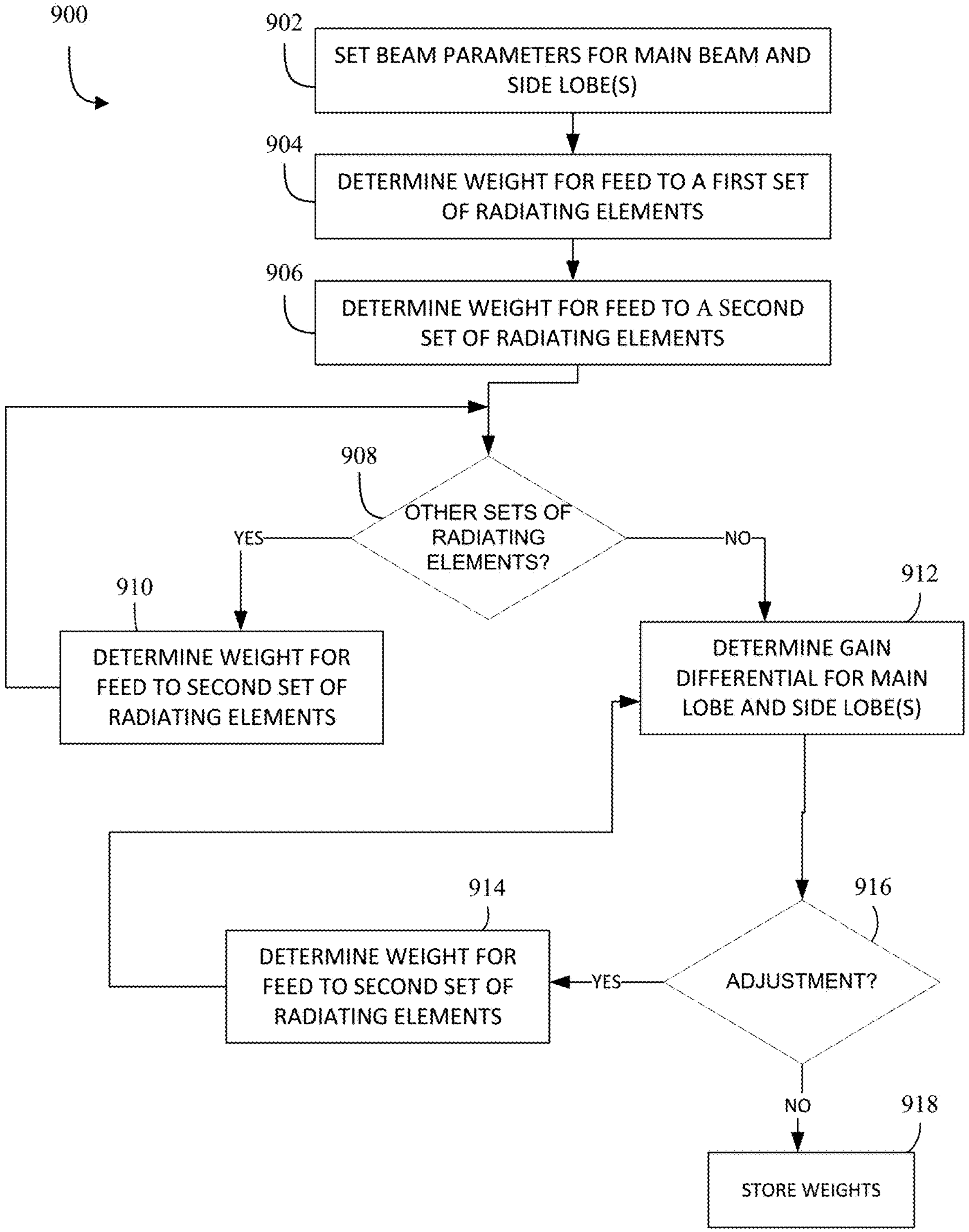
FIG. 9 illustrates a method for determining weights for an antenna system, according to embodiments of the present invention.

FIG. 9 illustrates a method 900 for configuring an antenna array system, in accordance with various embodiments. The method 900 includes setting beam parameters for the main beam and/or side lobes. In accordance with various embodiments, the amplitude tapering is enabled by setting a ratio of gain of the main lobe to the side lobe(s) to obtain a desired beamform.

The method 900 includes determining weight for feed to a first set of radiating elements at step 904, and determining weight for feed to a second set of radiating elements at step 906. As described above with respect to FIG. 6, a weight is applied to one or more of the transmission lines to reduce or increase the amount of power propagating through the transmission line(s). To determine, control and/or adjust the weights of transmission line(s), information is stored in the beam parameters database 620, which provides a mapping of sets of beam parameters to weight sets. The method 900 then includes determining whether to include other sets of radiating elements, at step 908. If the method 900 determines "yes", the method 900 proceeds to determine weights for feeds to a second set of radiating elements, 910, and returns to determining whether there are other sets of radiating elements, at step 908. In some implementations, the weights can be applied to the system as a whole. In some implementations, the weights can take different distributions depending on the beam shape. Some weight combinations that can be applied include, for example, Chebyshev weights and Taylor weights.

The method 900 includes performing steps 908 and 910 until the method 900 determines "no" at step 908, meaning there are no other sets of radiation elements.

If the method 900 determines "no", the method 900 proceeds to determining a gain differential for main to side lobe amplitudes, at step 912. If further adjustment is not to be made, at step 916, weights are stored, at step 913, for application. In some embodiments, the optimization of the design/configuration is complete, and the method can proceed to verify that the desired parameters perform properly. If there is a further adjustment, at step 916, the method 900 further includes determining weights for feeds to another set of radiating elements, at step 914, and proceeds to determining gain differential, at step 912. The method 900 includes performing steps 912, 916, and 914 until the method determines "no" at step 916, meaning no further adjustment is needed, and therefore, weights are stored in a configuration at step 918, to be used in the application of the antenna system.

In accordance with various embodiments, a method for configuring an antenna system is provided. The method includes setting a set of beam parameters for a main array and at least one edge array portion, wherein the main array includes a first plurality of radiating elements configured to generate a non-tapered beam having a main lobe and side lobes, and the at least one edge array portion includes a second plurality of radiating elements configured to taper the beam from the main array. The method includes determining weight for feed to the first plurality of radiating elements, determining weight for feed to the second plurality of radiating elements, determining a gain differential of the main lobe and the side lobes, and storing weights in a configuration for the antenna system.

In some embodiments, prior to determining the gain differential, the method further includes determining a further weight for feed to the second plurality of radiating elements. In some embodiments, after determining the gain differential, the method further includes determining a further weight for feed to the second plurality of radiating elements. In some embodiments, the first and second plurality of radiating elements have different arrangements. In some embodiments, the antenna system further comprises a feed distribution network, wherein the feed distribution network has a first set of transmission lines coupled to the first plurality of radiating elements and a second set of transmission lines coupled to the second plurality of radiating elements. In some embodiments, the antenna system further includes a gain control module to apply control weights to the first and second plurality of transmission lines respectively coupled to the first and second plurality of radiating elements.

FIG. 10 is an embodiment of an antenna array system 1000 having radiating elements 1004 arranged in a first configuration and having elements arranged in reduced edge portions, such as regions 1006, 1008, 1010, 1012 arranged at the corners of the antenna array 1002. In the configuration of radiating elements of array 1002, the radiating elements 1004 are arranged serially in the y-direction along paths, such as transmission path 1016. The reduced edge portions include radiating elements 1030 and 1014, which may be configured asymmetrically or otherwise to achieve a desired side lobe amplitude tamper. As illustrated in the figure, the reduced edge portions in the regions 1010 and 1008 include dissimilar configurations and different numbers of the respective radiating elements 1030 and 1014. As illustrated, a feed distribution network 1020 provides signals to the radiating elements of array 1002. In some embodiments, the feed distribution network 1020 may be positioned below the array 1002 feeding the radiating elements from a different direction.

In accordance with various embodiments and implementations, any of the methods 500, 900 and process 700 may be applied to any of the suitable antenna systems 100, 200, 300, 400, 600, 800, or 1000, unless otherwise stated.

The present invention presents radiating element configurations and methods for design thereof as well as operation of a resultant designed system. In some embodiments, reduced edge portions are provided with less radiating elements and/or reduction gaps to tamper the amplitude of side lobe radiation patterns. The reduction means to provide for a beamform with energy focused in the main lobe.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A method for configuring an antenna system, comprising:

setting a set of beam parameters for a main array and at least one edge array portion, wherein the main array comprises a first plurality of radiating elements configured to generate a non-tapered beam having a main lobe and side lobes, and wherein the at least one edge array portion comprises a second plurality of radiating elements arranged at a corner of the main array and configured to taper the beam from the main array;

determining a first configuration of the main array to achieve a main lobe gain;

determining a first weight for feed to the first plurality of radiating elements;

determining a second weight for feed to the second plurality of radiating elements;

determining a gain differential of the main lobe and the side lobes;

determining a second configuration of the at least one edge array to achieve the gain differential of main lobe and the side lobes;

determining whether further configuration adjustments of the at least one edge array are needed; and storing the first and second weights in a configuration for the antenna system.

2. The method of claim 1, prior to determining the gain differential, the method further comprising:

determining a further weight for feed to the second plurality of radiating elements.

3. The method of claim 1, after determining the gain differential, the method further comprising:

determining a further weight for feed to the second plurality of radiating elements.

4. The method of claim 1, wherein the first and second plurality of radiating elements have different arrangements.

5. The method of claim 1, wherein the antenna system further comprises a feed distribution network, wherein the feed distribution network has a first set of transmission lines coupled to the first plurality of radiating elements and a second set of transmission lines coupled to the second plurality of radiating elements.

6. The method of claim 5, wherein the antenna system further comprises a gain control module configured to apply control weights to the first and second sets of transmission lines respectively coupled to the first and second plurality of radiating elements.

7. The method of claim 1, wherein the second plurality of radiating elements of the at least one edge array portion form a rectangular gap at the corner of the main array.

8. The method of claim 1, wherein the at least one edge array portion forms a triangular gap at the corner of the main array.

9. The method of claim 1, wherein the at least one edge array portion forms a rectangular gap at the corner of the main array.

* * * * *